United States Patent
Furukawa et al.

(10) Patent No.: US 9,964,047 B2
(45) Date of Patent: May 8, 2018

(54) GAS TURBINE ENGINE OPTIMIZATION CONTROL DEVICE

(71) Applicant: IHI Corporation, Koto-ku (JP)

(72) Inventors: Hiroyuki Furukawa, Tokyo (JP); Moe Kinoshita, Tokyo (JP)

(73) Assignee: IHI Corporation, Koto-ku (JP)

( * ) Notice: Subject to any disclaimer, the term of this patent is extended or adjusted under 35 U.S.C. 154(b) by 135 days.

(21) Appl. No.: 15/010,258

(22) Filed: Jan. 29, 2016

(65) Prior Publication Data
US 2016/0146119 A1  May 26, 2016

Related U.S. Application Data

(63) Continuation of application No. PCT/JP2014/056482, filed on Mar. 12, 2014.

(30) Foreign Application Priority Data

Aug. 13, 2013  (JP) .................. 2013-168155

(51) Int. Cl.
*F02C 9/54* (2006.01)
*F02C 9/22* (2006.01)
(Continued)

(52) U.S. Cl.
CPC .................. *F02C 9/54* (2013.01); *F02C 9/22* (2013.01); *F02C 9/44* (2013.01); *G05B 13/021* (2013.01);
(Continued)

(58) Field of Classification Search
CPC ..... F02C 9/54; F02C 9/44; F02C 9/22; G05B 13/024; G05B 13/021; F02D 2270/709; F02D 2270/20
See application file for complete search history.

(56) References Cited

U.S. PATENT DOCUMENTS 6,226,974 B1  5/2001  Andrew et al.
8,490,404 B1  7/2013  Adibhatla et al.
(Continued)

FOREIGN PATENT DOCUMENTS

EP  0 363 301 A1  4/1990
JP  6-317180  11/1994
(Continued)

OTHER PUBLICATIONS

Extended European Search Report dated Apr. 5, 2017 in Patent Application No. 14836204.9.
(Continued)

*Primary Examiner* — Anne M Antonucci
(74) *Attorney, Agent, or Firm* — Oblon, McClelland, Maier & Neustadt, L.L.P.

(57) ABSTRACT

A gas turbine engine optimization control device estimates a specific fuel consumption using a given control parameter of a variable mechanism, determines a change between a specific fuel consumption estimation value by the control parameter of the variable mechanism in a previous operation period and a specific fuel consumption estimation value by the control parameter of the variable mechanism in this operation period, determines a new control parameter of the variable mechanism with which the specific fuel consumption estimation value approaches a minimum, adds the new control parameter of the variable mechanism to a preset control parameter initial value, and sets the addition value to be a control parameter command value of the variable mechanism in a next operation period.

3 Claims, 8 Drawing Sheets

(51) Int. Cl.
*F02C 9/44* (2006.01)
*G05B 13/02* (2006.01)

(52) U.S. Cl.
CPC ........ *G05B 13/024* (2013.01); *F05D 2270/20* (2013.01); *F05D 2270/709* (2013.01)

(56) References Cited

U.S. PATENT DOCUMENTS

| | | |
|---|---|---|
| 2012/0023953 A1 | 2/2012 | Thomas et al. |
| 2012/0215417 A1 | 8/2012 | Boyer et al. |

FOREIGN PATENT DOCUMENTS

| | | |
|---|---|---|
| JP | 2000-210152 | 8/2000 |
| JP | 2001-20760 | 1/2001 |
| JP | 2001-263094 | 9/2001 |
| JP | 2009-57955 | 3/2009 |
| JP | 2009-197670 | 9/2009 |
| JP | 4540956 | 9/2010 |
| JP | 2011-27053 | 2/2011 |
| JP | 2012-26449 | 2/2012 |
| JP | 2012-215575 | 11/2012 |
| JP | 2013-506793 | 2/2013 |
| JP | 2013-177890 | 9/2013 |

OTHER PUBLICATIONS

International Search Report dated May 13, 2014 in PCT/JP2014/056482, filed Mar. 12, 2014 (with English Translation).
Written Opinion dated May 13, 2014 in PCT/JP2014/056482, filed Mar. 12, 2014.

GAS TURBINE ENGINE OPTIMIZATION CONTROL DEVICE

CROSS REFERENCE TO RELATED APPLICATIONS

This application is a continuation application of International Application No. PCT/JP2014/056482, filed on Mar. 12, 2014, which claims priority to Japanese Patent Application No. 2013-168155, filed on Aug. 13, 2013, the entire contents of which are incorporated by reference herein.

BACKGROUND

1. Technical Field

The present disclosure relates to a gas turbine engine optimization control device.

2. Description of the Related Art

As a gas turbine engine control device that controls an engine by the number of revolutions or a pressure ratio correlated with thrust of a gas turbine engine, there has been known a system (an SISO (Single Input Single Output) system) that adjusts a fuel flow rate to control the number of revolutions of a fan. In a case of such a gas turbine engine control device, even though the number of revolutions can be controlled to be constant by flight points (an altitude, a jet speed, an air temperature) of a jet, a specific fuel consumption (SFC) cannot be controlled to be constant, and it continuously changes.

Consequently, a variable cycle engine has been proposed in order to eliminate the continuous change. The variable cycle engine is the engine that adjusts a cycle so that the specific fuel consumption SFC is made to be a minimum by various effectors, such as a variable mechanism, in addition to adjustment of the fuel flow rate. Schedule control utilizing a detection signal, such as a sensor signal, is generally used for controlling the variable mechanism.

In a gas turbine engine, each module, such as a fan, a compressor, a combustor, a high-pressure turbine, and a low-pressure turbine, deteriorates. However, when the schedule control of the gas turbine engine is performed, there has been a problem that the specific fuel consumption SFC is not always a minimum in any engine depending on a degree of deterioration of such an each module, or variation for each number machine.

SUMMARY

The present disclosure has been made in view of such a problem of a conventional technology, and an object thereof is to provide a gas turbine engine optimization control device that automatically searches for a variable mechanism command to always make a specific fuel consumption SFC to be a minimum by an optimization control technique in a variable cycle engine, always optimizes the specific fuel consumption to be the minimum even though the engine is deteriorated or performance has variation for each number machine, and that can achieve reduction of operational cost.

An aspect of the present disclosure is a gas turbine engine optimization control device, the device including: a specific fuel consumption estimation operation section that estimates a specific fuel consumption using a sensor feedback value of a control parameter of a variable mechanism given for each predetermined operation period; a control parameter reoperation section that determines a change between a specific fuel consumption estimation value based on a sensor feedback value of the control parameter of the variable mechanism in a previous operation period and a specific fuel consumption estimation value based on a sensor feedback value of the control parameter of the variable mechanism in this operation period, and determines a new control parameter command value of the variable mechanism with which the specific fuel consumption estimation value approaches a minimum; and a control parameter command value operation section that adds the new control parameter command value of the variable mechanism determined by the control parameter reoperation section to a preset control parameter initial value of the variable mechanism, and outputs the value as a control parameter command value of the variable mechanism in a next operation period.

In the above-described gas turbine engine optimization control device, a low-pressure turbine variable stator vane angle may be used as the control parameter of the variable mechanism.

In addition, in the above-described gas turbine engine optimization control device, any of an exhaust nozzle area, a compressor variable stator vane angle, a high-pressure turbine case cooling air flow rate, a low-pressure turbine case cooling air flow rate, a high-pressure turbine variable stator vane angle, a fan bypass area, an extraction force, and extraction steam may be used as the control parameter of the variable mechanism.

According to the present disclosure, the control parameter command value of the variable mechanism for always making the specific fuel consumption to be a minimum is automatically searched for by the optimization control technique of the gas turbine engine, and the gas turbine engine can be operated while always optimizing the specific fuel consumption even though the engine is deteriorated or performance has variation for each number machine, thus enabling to achieve reduction of operational cost of the gas turbine engine.

DESCRIPTION OF THE EMBODIMENTS

Hereinafter, an embodiment of the present disclosure will be explained in detail based on drawings. Note that hereinafter, the same or similar components will be explained using the same or similar symbols.

Figure 1:
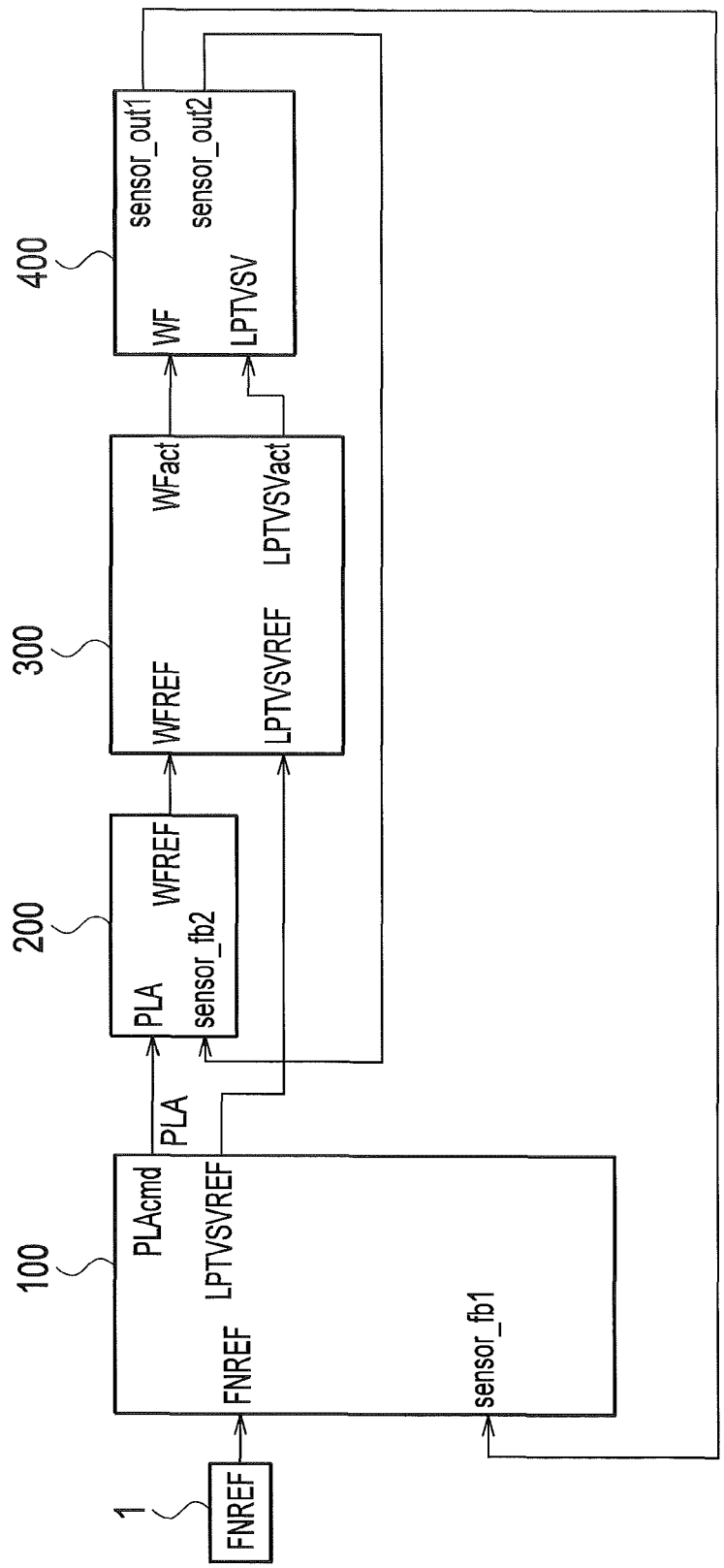
FIG. 1 is a block diagram showing a system configuration of a gas turbine engine optimization control device of one embodiment of the present disclosure.

A gas turbine engine optimization control device of the embodiment shown in FIG. 1 includes a computer system. In the embodiment, a case will be explained where a low-pressure turbine variable stator vane angle LPTVSV is controlled as a variable mechanism for optimization control of a variable cycle engine. However, as the variable mechanism adjusted for optimization control of a gas turbine engine, control to adjust not only the low-pressure turbine variable stator vane angle LPTVSV but a fan bypass outlet area and an exhaust nozzle area can also be employed.

The gas turbine engine optimization control device shown in FIG. 1 includes an optimization controller 100 and an engine control section 200 as main operation elements, an actuator drive section 300, and an actual engine 400. The optimization controller 100 manages a specific fuel consumption estimation operation section (a specific fuel consumption estimation operation unit), a control parameter command value operation section (a control parameter command value operation unit), and a control parameter reoperation section (a control parameter reoperation unit). The actuator drive section 300 gives a physical drive force to a corresponding actuator of the actual engine 400 with respect to command value outputs from the optimization controller 100 and the engine control section 200. The actual engine 400 is controlled to consume fuel while optimizing a specific fuel consumption SFC, and to generate a thrust. Sensor values are then fed back to the optimization controller 100 and the engine control section 200 from a sensor group installed in each place of the actual engine 400. The sensor feedback values are represented as a sensor_fb1 and a sensor_fb2.

It is an engine thrust command value FNREF from an FNREF input device 1 that is input to the system from an outside. The engine thrust command value FNREF is input to the optimization controller 100 from the FNREF input device 1. In addition, a sensor value sensor_out1 including a low-pressure turbine variable stator vane angle detection value output from the sensor group of the actual engine 400 is input as feedback to the optimization controller 100 as the sensor feedback value sensor_fb1. Additionally, the optimization controller 100 calculates a pilot throttle lever angle command value PLAcmd by an operation to improve the specific fuel consumption SFC that will be described later. The pilot throttle lever angle command value PLAcmd is output to the engine control section 200 as a pilot throttle lever angle PLA. In addition, the optimization controller 100 calculates a low-pressure turbine variable stator vane angle command value LPTVSVREF, and outputs it to the actuator drive section 300.

The engine control section 200 inputs the pilot throttle lever angle PLA from the optimization controller 100, and also inputs a sensor value sensor_out2 from the actual engine 400 as the sensor feedback value sensor_fb2. The engine control section 200 then calculates a fuel flow rate command value WFREF using the above-described values, and outputs it to the actuator drive section 300.

The actuator drive section 300 inputs the low-pressure turbine variable stator vane angle command value LPTVSVREF from the optimization controller 100, and also inputs the fuel flow rate command value WFREF from the engine control section 200. The actuator drive section 300 then gives a low-pressure turbine variable stator vane angle sensor value LPTVSVact, which is a low-pressure turbine variable stator vane drive signal corresponding to these values, to the actual engine 400, and drives an actual low-pressure turbine variable stator vane LPTVSV by a command angle. Simultaneously, the actuator drive section 300 gives an actual fuel flow rate signal WFact to the actual engine 400, and supplies fuel to the actual engine 400 with a fuel flow rate corresponding to the actual fuel flow rate signal WFact. As a result of this, the actual engine 400 is controlled to be operated by an optimum specific fuel consumption SFC. Additionally, the sensor value sensor_out1 is fed back to the optimization controller 100 and the engine control section 200 as the sensor feedback value sensor_fb1 from the sensor group of the actual engine 400, respectively. In addition, the sensor value sensor_out2 is fed back to the optimization controller 100 and the engine control section 200 as the sensor feedback value sensor_fb2 from the sensor group, respectively.

Figure 2:
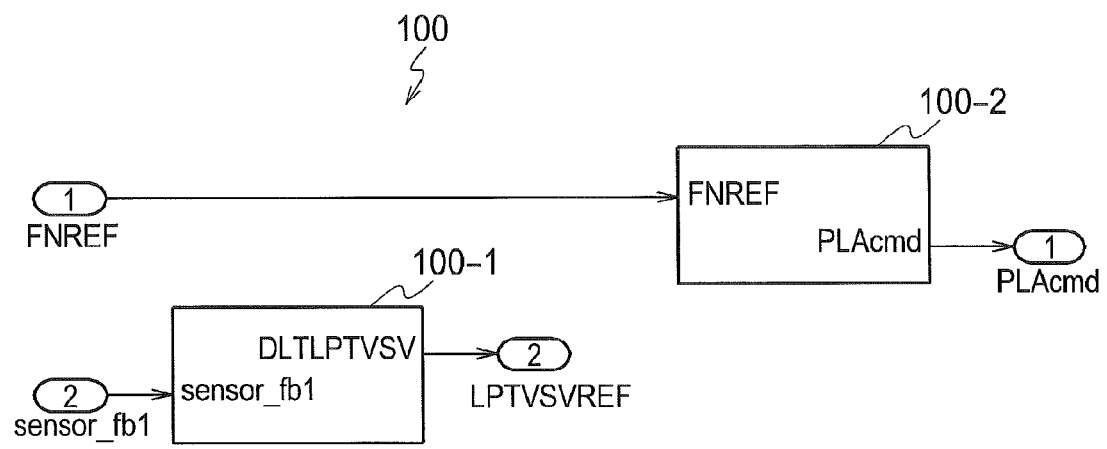
FIG. 2 is a block diagram showing an internal configuration of a controller in the gas turbine engine optimization control device of the above-described embodiment.

Next, the optimization controller 100 will be explained using FIGS. 2 and 3. As shown in FIG. 2, the optimization controller 100 includes a low-pressure turbine variable stator vane angle command value operation section 100-1 and a pilot throttle lever angle command value operation section 100-2. Additionally, the low-pressure turbine variable stator vane angle command value operation section 100-1 inputs the sensor feedback value sensor_fb1, and thereby outputs the low-pressure turbine variable stator vane angle command value LPTVSVREF from an output end DLTLPTVSV by optimum operation control. In addition, the pilot throttle lever angle command value operation section 100-2 of the optimization controller 100 calculates a pilot throttle lever angle corresponding to the input engine thrust command value FNREF, and outputs it as the pilot throttle lever angle command value PLAcmd.

Figure 3:
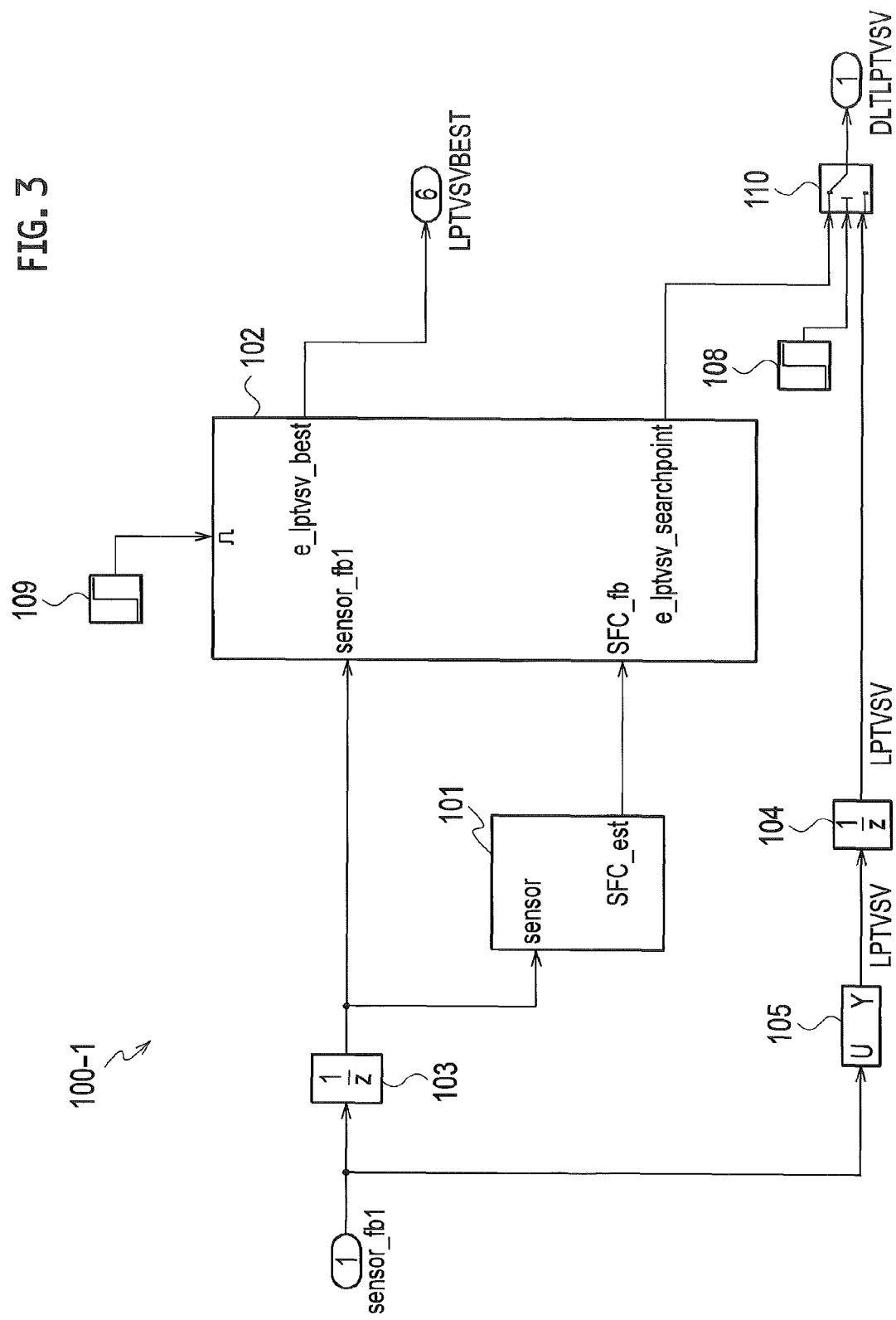
FIG. 3 is a block diagram showing an internal configuration of an engine thrust operation section in the controller in the gas turbine engine optimization control device of the above-described embodiment.

As shown in FIG. 3, the above-described low-pressure turbine variable stator vane angle command value operation section 100-1 in the optimization controller 100 includes a neural network operation device 101 and an optimization control operation device 102. The low-pressure turbine variable stator vane angle command value operation section 100-1 further includes: previous value holders 103 and 104; a selector 105; step signal devices 108 and 109; and a switch 110.

The sensor feedback value sensor_fb1 from the actual engine 400 is input to the optimization controller 100. The sensor feedback value sensor_fb1 is input to the previous value holder 103, and is input also to the previous value holder 104 through the selector 105.

The previous value holder 103 holds the newest sensor feedback value sensor_fb1 as an update value, and outputs the sensor feedback value sensor_fb1 held until then until a next update value is input. The previous sensor feedback value sensor_tb1 is input to the neural network operation device 101 as a sensor value 'sensor', and is simultaneously input also to the optimization control operation device 102 as the sensor feedback value sensor_fb1.

The selector 105 selects a low-pressure turbine variable stator vane angle feedback value e_lptvsv_fb from the input sensor feedback values sensor_fb1, and outputs it to the previous value holder 104 as an update value of the low-pressure turbine variable stator vane angle LPTVSV, and the previous value holder 104 holds the value. The previous value holder 104 holds a previous value until the update value of the low-pressure turbine variable stator vane angle LPTVSV is input, and outputs the previous value to the switch 110 as the low-pressure turbine variable stator vane angle LPTVSV.

The neural network operation device 101 estimates a specific fuel consumption SFC of the actual engine 400 using the input sensor value 'sensor', and outputs a specific fuel consumption estimation value SFC_est. The specific fuel consumption estimation value SFC_est of the neural network operation device 101 is input to the optimization control operation device 102 as a specific fuel consumption feedback value SFC_fb.

The optimization control operation device 102 inputs the sensor feedback value sensor_fb1 from the actual engine 400, and inputs the specific fuel consumption estimation value SFC_est as the specific fuel consumption feedback value SFC_fb from the neural network operation device 101. The optimization control operation device 102 further inputs a step signal from the step signal device 109. Additionally, when the step signal indicating operation execution is input from the step signal device 109, the optimization control operation device 102 determines a low-pressure turbine variable stator vane angle search value LPTVSV_SEARCHPOINT. The optimization control operation device 102 outputs the determined low-pressure turbine variable stator vane angle search value LPTVSV_SEARCHPOINT to the switch 110 from an output end e_lptvsv_searchpoint. In addition, simultaneously, the optimization control operation device 102 outputs a low-pressure turbine variable stator vane angle optimum value LPTVSV_BEST from an output end e_lptvsv_best. The low-pressure turbine variable stator vane angle optimum value LPTVSV_BEST is monitored through FIG. 4 and throughout the whole, which is described later.

The switch 110 is located at a lower side for a certain time, i.e., until the system is stabilized, and outputs the low-pressure turbine variable stator vane angle LPTVSV from the previous value holder 104 as a low-pressure turbine variable stator vane angle search value DLTPTVSV. However, when the system is stabilized, and a switching signal is input from the step signal device 108, the switch 110 is switched to an upper side, and outputs the low-pressure turbine variable stator vane angle search value LPTVSV_SEARCHPOINT as the low-pressure turbine variable stator vane angle search value DLTPTVSV.

Figure 4:
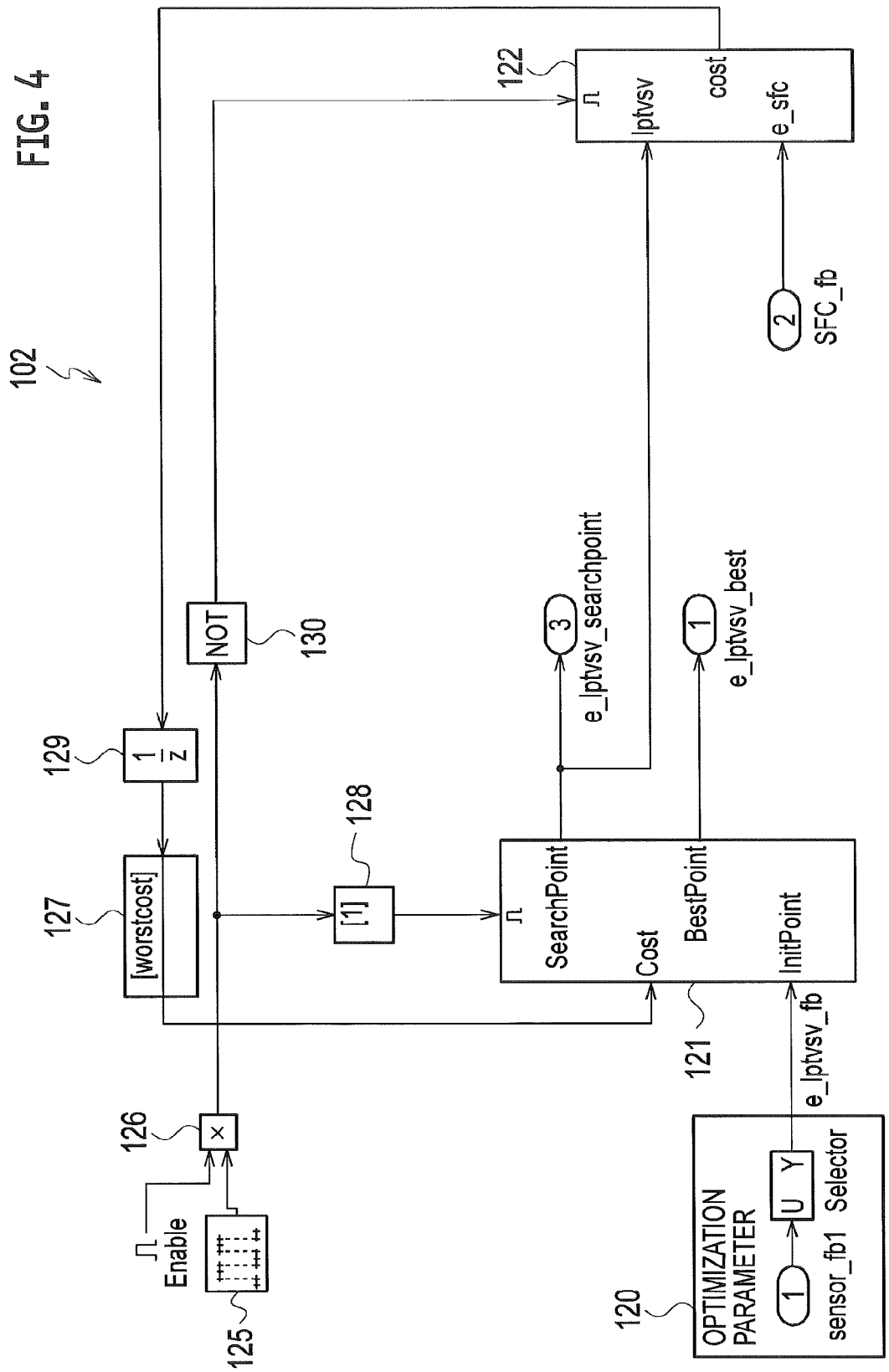
FIG. 4 is a block diagram showing an internal configuration of an optimization control operation device in the controller in the gas turbine engine optimization control device of the above-described embodiment.

The optimization control operation device 102 will be explained in more detail using FIG. 4. The optimization control operation device 102 includes as main components an optimization parameter feedback section 120, a pattern searcher 121, and a limit checker 122. In addition, the optimization control operation device 102 includes: a pulse generator 125; a logical product operation device 126; initial value setters 127 and 128; a previous value holder 129; and a logic inverter 130. The optimization control operation device 102 starts an operation at rise or fall timing (the rise timing is exemplified here) of a pulse of each predetermined operation period generated by the pulse generator 125, for example, a pulse of each 30 seconds, while an enable signal is given.

The optimization parameter feedback section 120 makes the sensor feedback value sensor_fb1 pass through the selector, and inputs only the low-pressure turbine variable stator vane angle feedback value e_lptvsv_fb to an input end InitPoint of the pattern searcher 121.

A one-period prior low-pressure turbine variable stator vane angle feedback value e_lptvsv_fb is input to the input end InitPoint of the pattern searcher 121 from the optimization parameter feedback section 120. The low-pressure turbine variable stator vane angle feedback value is selected from the sensor feedback values sensor_fb1. In addition, an evaluation value 'cost' output from the limit checker 122 is input to an input end Cost through the previous value holder 129 and the initial value setter 127. Additionally, the pattern searcher 121 decides an optimization parameter search value for each constant operation period (for example, 30 seconds). Further, the pattern searcher 121 outputs a low-pressure turbine variable stator vane angle search value e_lptvsv_searchpoint from an output end SearchPoint. In addition, the pattern searcher 121 outputs an optimum value of a past low-pressure turbine variable stator vane angle from an output end BestPoint as a low-pressure turbine variable stator vane angle optimum value e_lptvsv_best.

The low-pressure turbine variable stator vane angle search value e_lptvsv_searchpoint is output from the output end SearchPoint, and is input to an input end of a low-pressure turbine variable stator vane angle operation value lptvsv in the limit checker 122. In addition, the specific fuel consumption feedback value SFC_fb is input to an input end e_sfc of the limit checker 122. The limit checker 122 then determines whether or not the low-pressure turbine variable stator vane angle search value e_lptvsv_searchpoint determined by the pattern searcher 121 is larger than an upper-limit value, or is smaller than a lower-limit value. If the low-pressure turbine variable stator vane angle search value e_lptvsv_searchpoint then does not exceed either of the limit values, the limit checker 122 outputs the specific fuel consumption feedback value SFC_fb (the specific fuel consumption estimation value SFC_est) to the previous value holder 129 from an output end thereof as the evaluation value 'cost' to optimize the specific fuel consumption SFC. However, if the low-pressure turbine variable stator vane angle search value e_lptvsv_searchpoint exceeds either of the above-described limit values, the limit checker 122 outputs a preset worst evaluation value 'worstcost' as the evaluation value 'cost'.

The previous value holder 129 receives this evaluation value 'cost', and updates a hold value. The initial value setter 127 holds the worst evaluation value 'worstcost' previously given as an initial value, and outputs the worst evaluation value 'worstcost' to the input end Cost of the pattern searcher 121 at the beginning of calculation. Additionally, if calculation of the system is stabilized after that, and the evaluation value 'cost' comes to be calculated, the initial value setter 127 outputs a value from the previous value holder 129. Consequently, the pattern searcher 121 performs the above-mentioned operation, and outputs the low-pressure turbine variable stator vane angle search value e_lptvsv_searchpoint from the output end SearchPoint. In addition, the pattern searcher 121 outputs the past low-pressure turbine variable stator vane angle optimum value e_lptvsv_best from the output end BestPoint.

Figure 5:
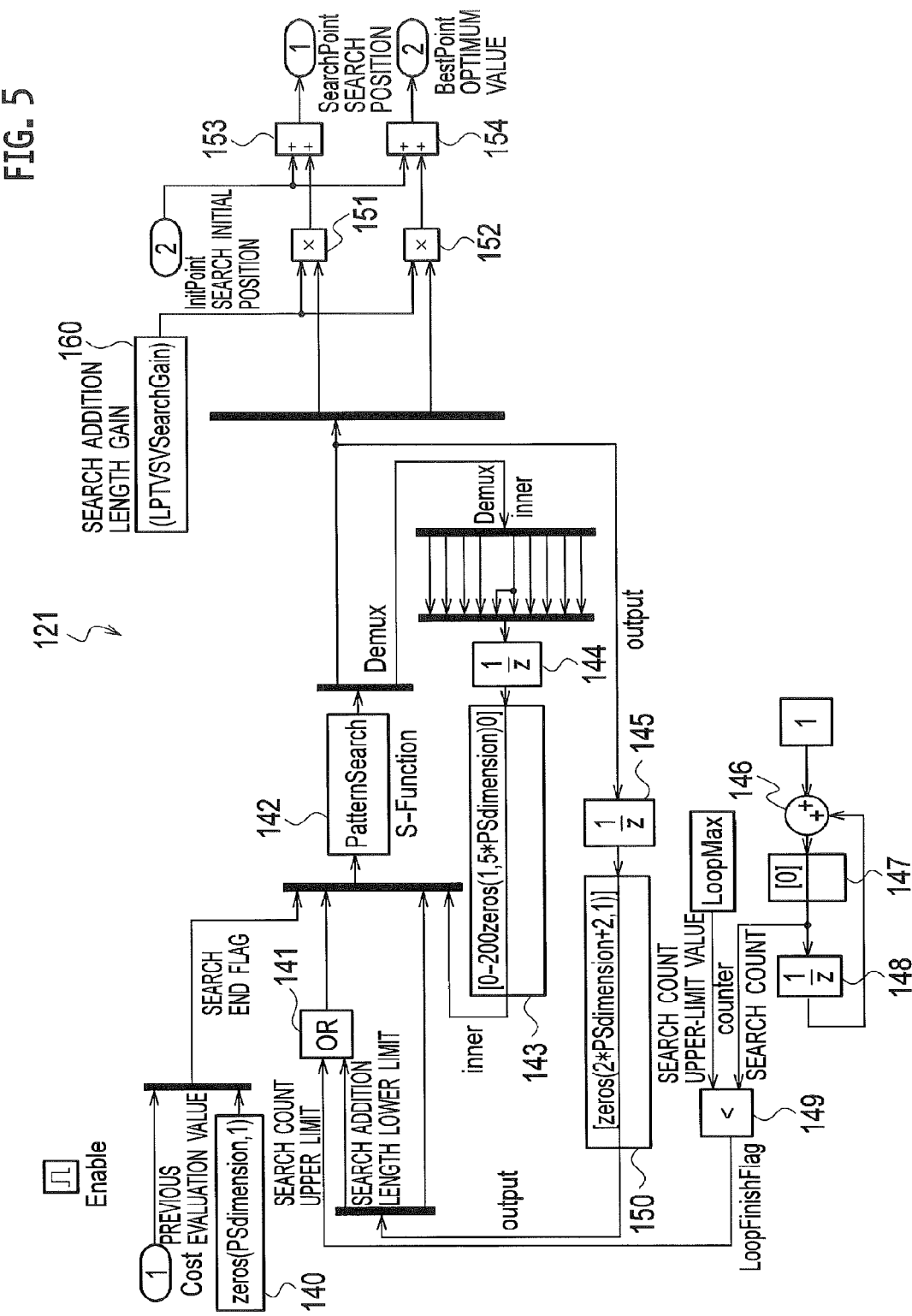
FIG. 5 is a block diagram showing an internal configuration of a pattern searcher in the above-described optimization control operation device.

The pattern searcher 121 in the optimization control operation device 102 will be explained in detail using FIG. 5. The pattern searcher 121 performs an operation for each period (for example, 30 seconds) of the enable signal. The pattern searcher 121 includes a pattern search execution section 142 that executes a pattern search, and zero value setters 140, 143, 147, and 150 that set zero needed as an initial value of the operation. The pattern searcher 121 further includes: previous value holders 144, 145, and 148; a logical sum operation device 141; an adder 146; a comparator 149; multipliers 151 and 152; and adders 153 and 154. A search count upper-limit value LoopMax is given to the comparator 149 as a comparison value, an increment value one is given to the adder 146, and a search addition length gain is given to the multipliers 151 and 152 as a predetermined value from a gain setter 160.

The adder 146 counts a search count. Specifically, the adder 146 adds one to a previous value held by the previous value holder 148, sets the addition value as this search count, and outputs it to the comparator 149. The comparator 149 compares the search count calculated by the adder 146 with the search count upper-limit value LoopMax. If this search count reaches the search count upper-limit value, the comparator 149 outputs a search count upper-limit reach flag LoopFinishFlag to the logical sum operation device 141. If not, it does not output the search count upper-limit reach flag LoopFinishFlag. If the search count upper-limit reach flag is input, or a search addition length lower limit reach signal is input, the logical sum operation device 141 outputs a search end flag endflg. If not, it does not output the search end flag endflg.

The pattern search execution section 142 inputs a previous specific fuel consumption estimation value as a previous evaluation value 'cost', and compares the previous specific fuel consumption estimation value with this specific fuel consumption estimation value. If the specific fuel consumption estimation value is then improved, the pattern search execution section 142 searches in a same direction (course), and decides and outputs a next low-pressure turbine variable stator vane angle command value.

The pattern searcher 121 adds a control parameter initial value (an initial control parameter) (for example, it is set to be 2.5 deg, and is defined as 50%) as a search initial position to the low-pressure turbine variable stator vane angle command value obtained by the pattern search execution section 142, and outputs it as this search position SearchPoint. The pattern searcher 121 adds the control parameter initial value also to a previous optimum search value, and outputs a low-pressure turbine variable stator vane angle optimum value BestPoint. The search position SearchPoint is output from the SearchPoint output end in the pattern searcher 121 as the low-pressure turbine variable stator vane angle search value e_lptvsv_searchpoint. In addition, the optimum value BestPoint is output from the BestPoint output end in the pattern searcher 121 as the low-pressure turbine variable stator vane angle optimum value e_lptvsv_best.

When the search count reaches the search count upper-limit value LoopMax or a search addition length lower limit, the pattern searcher 121 outputs the search end flag endflg, and ends the pattern search.

Figure 6:
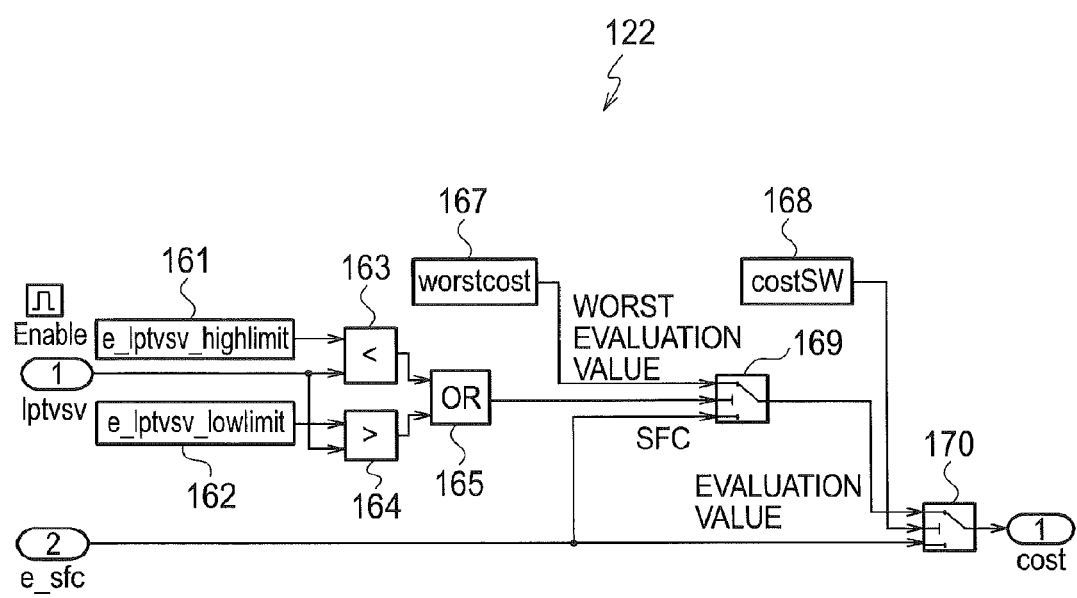
FIG. 6 is a block diagram showing an internal configuration of a limit checker in the above-described optimization control operation device.

Next, the limit checker 122 in the optimization control operation device 102 will be explained using FIG. 6. The limit checker 122 includes: an upper limit setter 161; a lower limit setter 162; comparators 163 and 164; a logical sum operation device 165; a worst evaluation value setter 167; an evaluation value output switching signal device 168; an evaluation value switcher 169; and an output switcher 170.

The limit checker 122 inputs the low-pressure turbine variable stator vane angle operation value lptvsv, and a specific fuel consumption estimation value e_sfc, and outputs a next specific fuel consumption estimation value SFC_est as the evaluation value 'cost'. When the low-pressure turbine variable stator vane angle operation value lptvsv rises exceeding an upper-limit value, or falls exceeding a lower-limit value, the evaluation value switcher 169 in the limit checker 122 outputs the worst evaluation value 'worstcost'. Otherwise, the evaluation value switcher 169 outputs the specific fuel consumption operation value e_sfc as the specific fuel consumption estimation value SFC_est.

When the evaluation value output switching signal device 168 outputs a switching signal, the output switcher 170 outputs the specific fuel consumption operation value e_sfc as the evaluation value 'cost'. Meanwhile, when the switching signal is not output, the output switcher 170 outputs the output of the evaluation value switcher 169 as the evaluation value 'cost'. As a result of this, even when the evaluation value 'cost' exceeds a worst value to a worse side, the output switcher 170 is prevented from outputting a bad value due to the evaluation value 'cost' exceeding the limit by outputting the worst evaluation value 'worstcost'. The evaluation value 'cost' is output as an evaluation value of a specific fuel consumption from an output end 'cost' in the limit checker 122 in FIG. 4.

Figure 7:
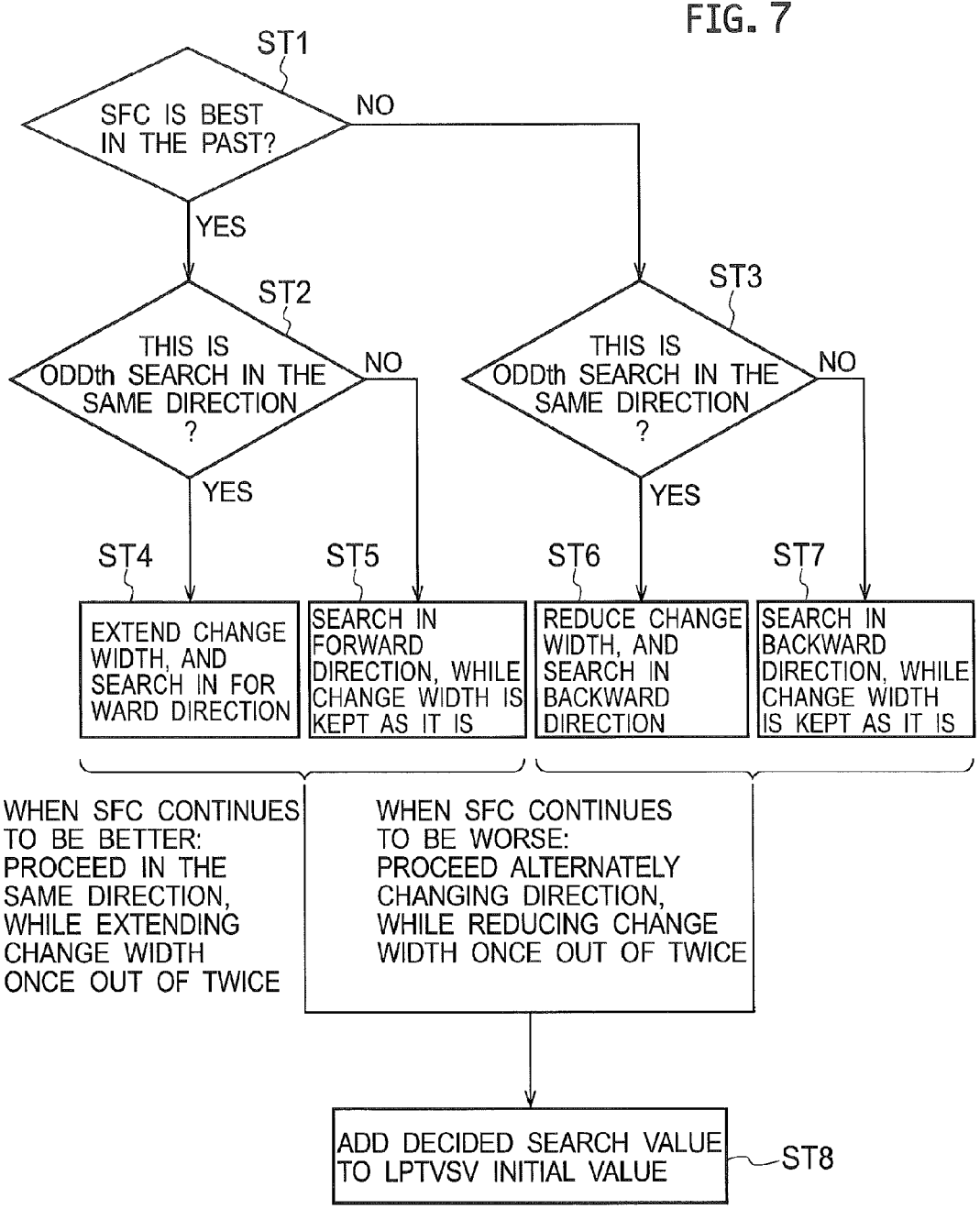
FIG. 7 is a flow chart of a control parameter value optimum value search of a variable mechanism by the above-described optimization control operation device.

Next, processing operations by the gas turbine engine optimization control device having the above configuration will be explained using a flow chart of FIG. 7.

1) Optimization of Control Parameter

In the neural network operation device 101 in the optimization controller 100, deterioration of an engine model is identified, the specific fuel consumption estimation value SFC_est is determined, and the specific fuel consumption estimation value SFC_est is input to the optimization control operation device 102. In the optimization control operation device 102, a search for the low-pressure turbine variable stator vane angle LPTVSV, which is a control parameter with which the specific fuel consumption SFC as the evaluation value 'cost' is a minimum, is performed.

2) Setting of Search Value of Control Parameter

In the pattern searcher 121 in the optimization control operation device 102, a previous specific fuel consumption estimation value is input to the Cost input end for each 30 seconds as a constant operation period. In addition, the low-pressure turbine variable stator vane angle feedback value e_lptvsv_fb is fed back to the input end InitPoint from a sensor. The pattern searcher 121 observes in search of this specific fuel consumption estimation value from the previous specific fuel consumption estimation value and the low-pressure turbine variable stator vane angle feedback value e_lptvsv_fb (step ST1). If this specific fuel consumption estimation value is then improved more than the previous specific fuel consumption estimation value, processing branches to YES in step ST1. Additionally, the pattern searcher 121 searches for and outputs a low-pressure turbine variable stator vane angle search value in a direction where a next specific fuel consumption estimation value is reduced (steps ST2, ST4, and ST5).

Here, if the low-pressure turbine variable stator vane angle search value is in a direction where this specific fuel consumption estimation value increases more than the previous specific fuel consumption estimation value, processing branches to NO in step ST1. The pattern searcher 121 then searches in an opposite direction in order to reduce a change width of the low-pressure turbine variable stator vane angle search value, and determines the low-pressure turbine variable stator vane angle search value (steps ST3, ST6, and ST7). A pattern search method executed by the pattern searcher 121 described above is a general steepest descent method.

In this pattern search method, the low-pressure turbine variable stator vane angle search value is added to a control parameter search initial value InitPoint, the addition value is set to be a next low-pressure turbine variable stator vane angle command value, and operation of the actual engine 400 is performed in conjunction with a fuel flow rate etc. (step ST8).

Note that a control parameter to be optimized is not limited to the low-pressure turbine variable stator vane angle LPTVSV used in the above-described embodiment. Any of an exhaust nozzle area, a compressor variable stator vane angle, a high-pressure turbine case cooling air flow rate, a low-pressure turbine case cooling air flow rate, a high-pressure turbine variable stator vane angle, a fan bypass area, an extraction force, and extraction steam may be used.

3) Limit Value Check

The limit checker 122 in the optimization control operation device 102 confirms whether or not the low-pressure turbine variable stator vane angle command value exceeds a limit value. If the low-pressure turbine variable stator vane angle command value is smaller than the limit value, the limit checker 122 uses the previous specific fuel consumption estimation value as an evaluation value of the search. If the low-pressure turbine variable stator vane angle command value exceeds the limit value, the limit checker 122 sets the worst evaluation value 'worstcost' to the SFC, and prevents the previous specific fuel consumption estimation value from being updated in subsequent operations.

PRACTICAL EXAMPLE

Figure 8:
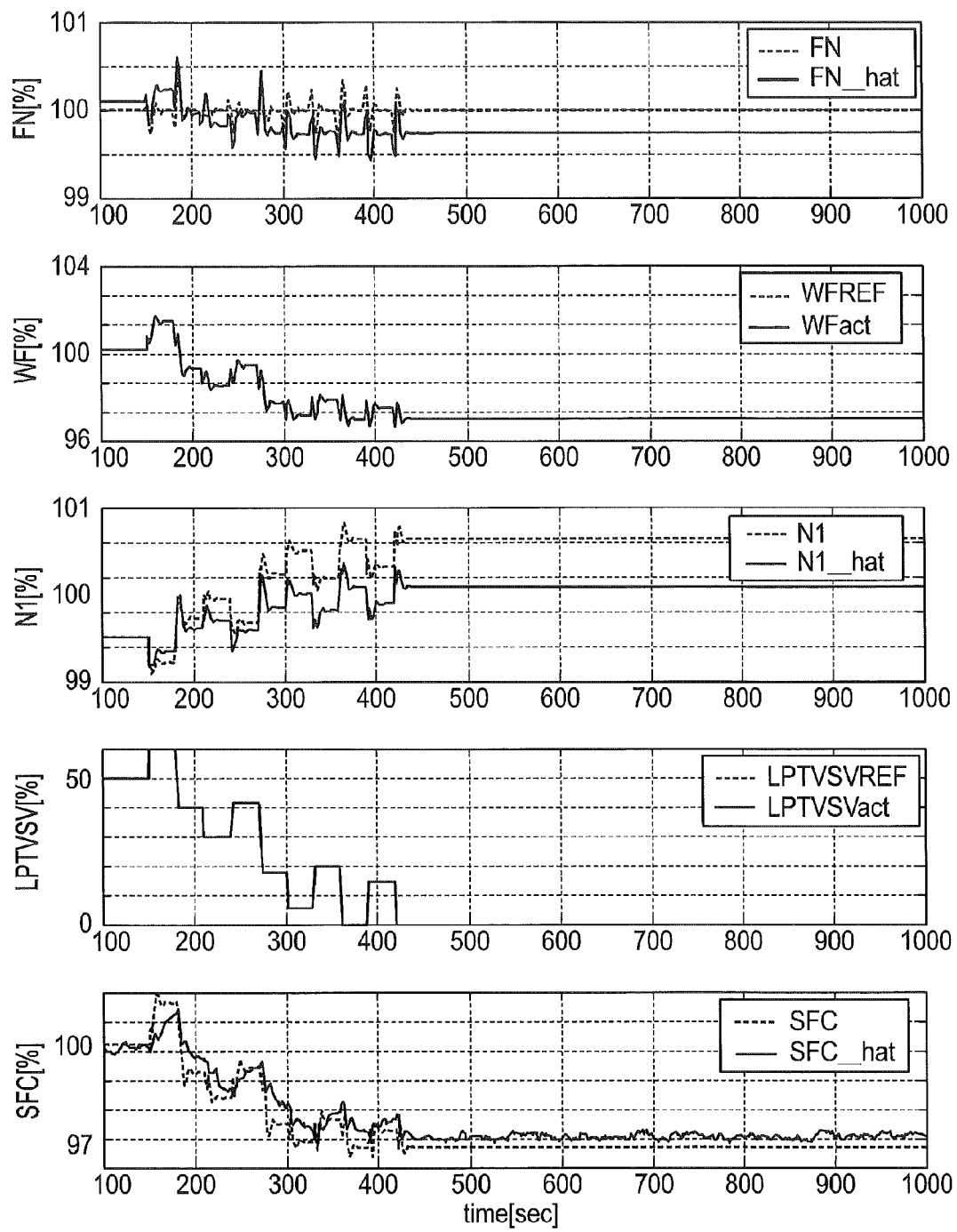
FIG. 8 is a graph showing control characteristics of a practical example of the present disclosure.

Results simulated by the gas turbine engine optimization control device of the above-described embodiment are shown in a graph of FIG. 8. FIG. 8 shows transition of a sensor value and an estimation value of the specific fuel consumption SFC started as a control parameter from 50% of a low-pressure turbine variable stator vane angle command value. A reference character FN denotes engine thrust. A reference character FNest denotes an engine thrust estimation value. A reference character WFREF is a fuel flow rate command value. A reference character WFact is a fuel flow rate actual value. A reference character N1 is an estimation value of an engine speed (a low pressure) A reference character N1est is an estimation value of the engine speed (the low pressure).

A reference character LPTVSVREF is a low-pressure turbine variable stator vane angle command value. A reference character LPTVSVact is a low-pressure turbine variable stator vane angle sensor value. A reference character SFC is an actual specific fuel consumption. A reference character SFC_est is a specific fuel consumption estimation value.

As is seen from this graph, the low-pressure turbine variable stator vane angle command value LPTVSVREF and the low-pressure turbine variable stator vane angle sensor value LPTVSVact coincide with each other, and both are stable at 0%. The specific fuel consumption SFC and the specific fuel consumption estimation value SFC_est are also settled near 97% in association with the movement of the low-pressure turbine variable stator vane angle sensor value LPTVSVact. As a result of this, it can be understood that an optimum value was obtained.

Conventionally, a correction value of a control parameter command value was added to a previous search value, and the addition value was set to be a next search value using an engine model, in order to search for a control parameter with which the specific fuel consumption SFC could be optimally controlled. In contrast with this, in the gas turbine engine optimization control device of the embodiment, the correction value of the control parameter command value is added to an initial set value, the addition value is set to be the next search value, and the control parameter with which the specific fuel consumption is made an optimum is searched for. As a result of this, according to the gas turbine engine optimization control device of the embodiment, the control parameter to quickly reach a minimum specific fuel consumption SFC can be obtained. Here, in the method in which the correction value of the control parameter command value is added to the previous search value, and the addition value is set to be the next search value, a problem occurs when the specific fuel consumption has a downward convex relation with the search value. Namely, although an addition amount decreases when the specific fuel consumption passes through a bottom in the relation, there is a problem that the search value is in a direction increasing more than the previous search value, the fuel consumption estimation value becomes larger than a lowest-ever estimation value, and that an optimum value cannot be found. However, if the method is employed in which the correction value is added to the initial set value as in the gas turbine engine optimization control device of the embodiment, the problem can be solved.

What is claimed is:

1. A gas turbine engine optimization control device comprising:
   a specific fuel consumption estimation operation section that estimates a specific fuel consumption using a sensor feedback value of a control parameter of a variable mechanism given for each predetermined operation period;
   a control parameter reoperation section that determines a change between a specific fuel consumption estimation value based on a sensor feedback value of the control parameter of the variable mechanism in a previous operation period and a specific fuel consumption estimation value based on a sensor feedback value of the control parameter of the variable mechanism in this operation period, and determines a new control parameter command value of the variable mechanism with which the specific fuel consumption estimation value approaches a minimum; and
   a control parameter command value operation section that adds the new control parameter command value of the variable mechanism determined by the control parameter reoperation section to a preset control parameter initial value of the variable mechanism, and outputs the value as a control parameter command value of the variable mechanism in a next operation period.

2. The gas turbine engine optimization control device according to claim 1, wherein a low-pressure turbine variable stator vane angle is used as the control parameter of the variable mechanism.

3. The gas turbine engine optimization control device according to claim 1, wherein any of an exhaust nozzle area, a compressor variable stator vane angle, a high-pressure turbine case cooling air flow rate, a low-pressure turbine case cooling air flow rate, a high-pressure turbine variable stator vane angle, a fan bypass area, an extraction force, and extraction steam is used as the control parameter of the variable mechanism.

* * * * *